Aug. 9, 1927.
R. N. MURAKAMI
FUEL ECONOMIZER
Filed May 24, 1922
1,638,015
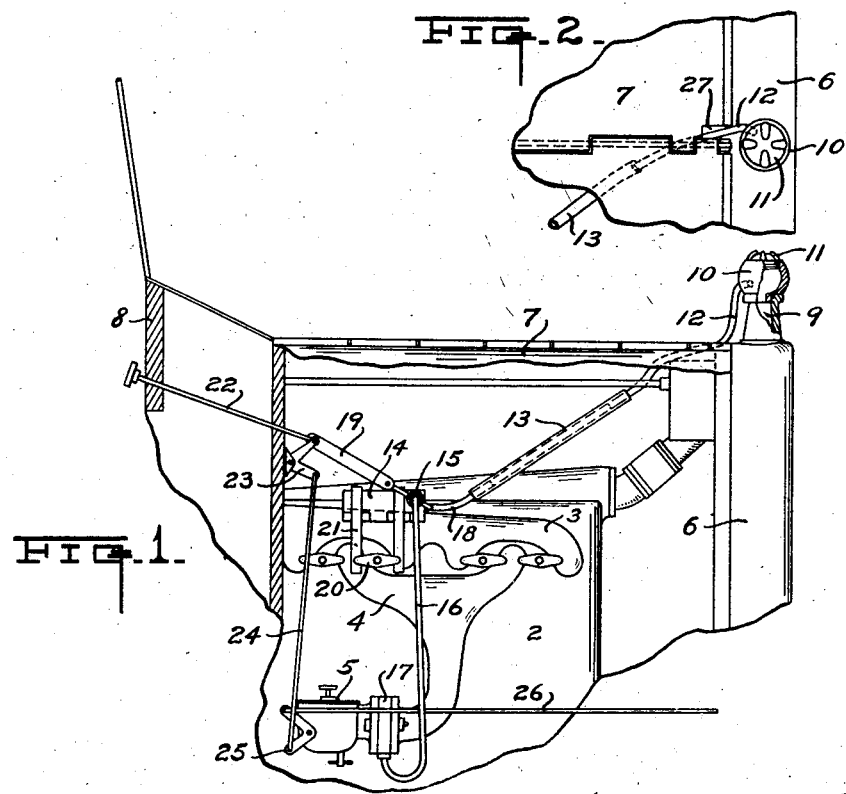
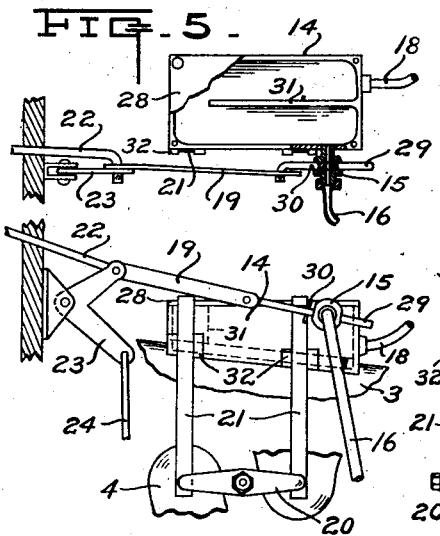
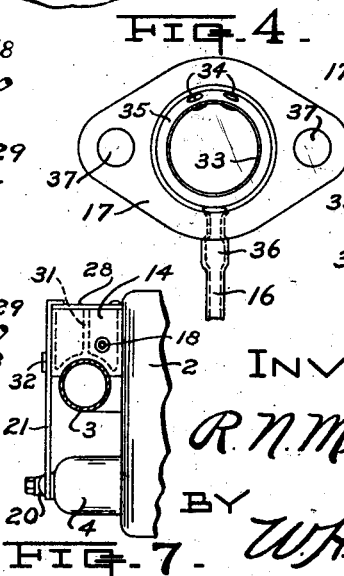
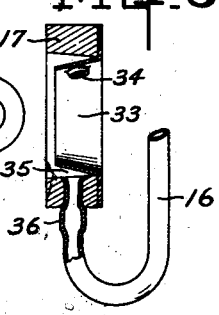
INVENTOR.
R. N. Murakami
BY W. H. Lieber
ATTORNEY.

Patented Aug. 9, 1927.

1,638,015

UNITED STATES PATENT OFFICE.

RIN N. MURAKAMI, OF PORT WASHINGTON, WISCONSIN, ASSIGNOR TO HARRY W. BOLENS, OF PORT WASHINGTON, WISCONSIN.

FUEL ECONOMIZER.

Application filed May 24, 1922. Serial No. 563,250.

This invention relates in general to improvements in the construction and operation of fuel economizers for energy converting apparatus, the invention being especially applicable to power plants such as the water cooled internal combustion engine units universally employed for propelling motor driven vehicles.

An object of the invention is to provide a fuel economizer which is simple in construction and efficient in operation.

It has heretofore been proposed to admit steam or vapor to the cylinders of internal combustion engines, in conjunction with the fuel, in order to effect a reduction in the fuel consumption. Such appliances are especially advantageous when applied to liquid fuel actuated internal combustion engines such as the ordinary gasoline operated automobile and tractor propelling motors having cooling systems wherein water is employed as a cooling agent for maintaining proper temperatures in the engine cylinders.

The present invention contemplates the provision of a fuel economizer for internal combustion engines, which may be readily applied to or removed from existing standard automobile motors. The simplicity of the improved economizer enables manufacture and sale thereof at minimum cost, and also permits installation and subsequent operation thereof by a novice. The installation of the improved apparatus necessitates no reconstruction of existing motor unit parts, permitting utilization of structure forming part of most standard automobile motors to effect permanent attachment of the various elements. The improved device moreover does not interfere with normal operation of a motor to which it is applied, and has been found capable of effecting an average saving in the fuel consumption of a Ford motor, of over twenty-five per cent, when operating under normal conditions.

A clear conception of an embodiment of the present invention and of the operation of devices constructed in accordance therewith, may be had by referring to the drawing accompanying and forming a part of this specification, in which like reference characters designate the same or similar parts in the various views.

Fig. 1 is a part sectional fragmentary side view of an automobile power plant of the water cooled internal combustion engine type, having the improved fuel economizer applied thereto.

Fig. 2 is a fragmentary top view of the forward portion of the apparatus shown in Fig. 1, illustrating the manner of passing the vapor collector connection through the engine protecting hood.

Fig. 3 is an enlarged central vertical section through the improved vapor injector which is adapted for insertion between the carburetor and the engine intake manifold.

Fig. 4 is an enlarged rear elevation of the improved vapor injector.

Fig. 5 is an enlarged fragmentary part sectional top view of an improved vapor super-heater and vapor control mechanism which is adapted for attachment to the engine exhaust manifold.

Fig. 6 is an enlarged fragmentary side elevation of the improved vapor super-heater and the vapor control mechanism, showing the manner of attachment thereof to the engine.

Fig. 7 is an enlarged fragmentary front view of the improved vapor super-heater, showing the manner of attachment thereof to the engine.

The power unit illustrated herein comprises generally a multi-cylinder internal combustion engine 2, an exhaust manifold 3 adapted to receive spent gases of combustion from the engine 2, a fuel supply manifold 4 adapted to deliver vaporized fuel to the engine 2, a carburetor 5 for vaporizing liquid hydrocarbon fuel and for delivering the vaporized fuel to the manifold 4, and a cooling water radiator 6 located in front of the engine 2 for reducing the temperature of the water circulated therethrough from the cylinder jackets of the engine. The intake and exhaust manifolds 4, 3, which are constructed as elements separate and detachable from the engine 2, are rigidly attached to the engine block by means of clamps 20. The carburetor 5 is provided with the usual choke mechanism controllable from the dash board 8 and from in front of the engine radiator 6, by means of rods 22, 26 respectively, the former of these rods being connected with the actuating bell crank 25 by means of a bell crank 23 and a connection 24, and the latter of these rods being connected directly to the bell crank 25. The cooling radiator 6 besides having suitable inlet and return connections with the engine 2, is provided with an internally threaded filling orifice 9 capable of being normally closed by means of an externally threaded plug or cap 11. The entire engine and associated mechanism is housed beneath a pair of hinged readily removable sheet metal hoods 7 which substantially span the gap between the dash board 8 and the radiator 6. All of these elements of the power unit are standard equipment of the majority of automobile propelling units at present in commercial use.

The improved fuel economizer forming the subject of the present invention is attachable as an accessory to the type of power unit hereinabove described, and comprises generally a vapor collector 10, a super-heater 14, piping 12, 13, 18 forming a conduit connecting the vapor collector 10 with the super-heater 14, a vapor injector 17, piping 16 forming a conduit connecting the super-heater 14 and the injector 17, and a valve 15 for controlling the flow of vapor through the economizer. The vapor collector 10 consists of a hollow casing or body having a lower externally threaded portion adapted for coaction with the internal threads of the filling orifice 9, and having an upper internally threaded portion adapted to receive a standard radiator cap 11. The vapor conducting pipe 12 communicates with the interior of the vapor collector 10, preferably through the wall at the rear thereof, and extends downwardly and through the engine hood 7 which is provided with a cut-away portion 27 closely adjacent the pivot of the hood, in order to accommodate penetration of the hood 7 by the pipe 12. The lower extremity of the pipe 12 is preferably connected with the forward end of the super-heater inlet pipe 18 by means of a flexible tube or pipe 13 which is slipped over the adjacent ends of the pipes 12, 18. The pipe 18 communicates with the lower forward portion of the casing of the super-heater 14, this casing being removable from and having its bottom formed to closely fit the top of the exhaust manifold 3 of the engine 2. The interior of the super-heater casing is provided with a partition 31 extending longitudinally of the super-heater 14 and dividing the super-heater into communicating elongated chambers. The super-heater 14 is normally closed by means of a removable cover 28 and is provided with lugs 32 on the front side thereof which form retainers for vertical straps 21. The straps 21 have upper extremities engaging the top and side portions of the super-heater 14, and have their lower extremities firmly united with the intake and exhaust manifolds of the engine 2, by means of one of the clamps 20. The vapor conducting pipe 16 communicates with the super-heater 14 through a control valve 15 having a reciprocable valve rod 29 provided with a transverse stop pin 30 for determining open position of the valve 15. The rear extremity of the valve rod 29 is connected to the bell crank 23 by means of a detachable connection 19. It should be noted however, that the valve rod actuating connection 19 may extend rearwardly to and be actuable directly from the dash board 8, instead of by means of the choke rod 22, as illustrated.

The lower extremity of the vapor conducting pipe 16 has a reverse bend therein and communicates with a V-shaped groove 35 formed in the vapor injector. The vapor injector consists of a relatively thick plate 17 having a conical bore and provided with parallel openings 37 adapted to receive the clamping bolts which normally clamp the carburetor 5 to the intake manifold 4. Within the conical bore of the plate 17 is located a rearwardly converging frusto-conical sheet metal nozzle plate 33. The annular V-shaped groove 35 is formed between the bore of the plate 17 and the exterior tapered surface of the nozzle plate 33, and communicates at its lower portion with the pipe 16 and at its upper portion with the intake manifold 4 through a pair of openings or orifices 34. The vapor supply pipe 16 is provided with an enlarged or bulged portion 36 and is spun into firm engagement with the plate 17.

During normal operation of the power unit, the engine 2 is being supplied with vaporized liquid hydrocarbon fuel from the carburetor 5 through the intake manifold 4, and the exhaust gases are being discharged in highly heated condition through the exhaust manifold 3. The engine cylinders are being cooled by the water circulating through the cylinder jackets and through the radiator 6. As the water circulates through the radiator 6, the vapor accumulates in the upper portion of the radiator 6 near the filling orifice 9. When the fuel economizer is operating, the valve rod 29 is positioned as indicated in Fig. 5 thereby producing a suction in the pipes 12, 13, 18, 16 and in the super-heater 14. This suction is produced by the reduction in pressure in the intake manifold 4 and causes the vapor generated in the radiator 6 to be automatically withdrawn from the vapor collector 10 into the super-heater 14. In the super-heater 14 the vapor is transformed into super-heated steam by radiation from the exhaust manifold 3. The super-heated steam passes through the control valve 15 and conducting pipe 16 into the annular V-shaped groove 35 from whence it is withdrawn through the orifices 34 and mingles with the fuel mixture passing through the central opening in the nozzle plate 33. The mixture of atomized fuel, air and vapor flows through the intake manifold 4 to the engine cylinders. It will thus be noted that the operation of the fuel economizer is entirely automatic, and is controllable at will by means of the control valve 15.

The fuel economizer may be readily attached without modifying the existing engine structure further than to remove the portion 27 of the hood 7, to existing automobile units. The installation of this accessory and the subsequent operation thereof, may be effected by a novice, and the accessory may be readily removed if not desired. The simplicity of the device permits manufacture and sale thereof at minimum cost, by virtue of the fact that structure forming part of the standard automobile motor may be utilized to effect permanent attachment of the various elements. The economizer does not interfere with normal operation of a motor to which it is applied, the hoods 7 being freely movable without interfering with the vapor conducting pipe 12 by virtue of the cut-away portion 27. The improved device has proven itself capable of effecting an enormous saving in the fuel consumption of an automobile motor when operating under normal conditions.

It should be understood that it is not desired to limit the invention to the exact details of construction and of operation herein shown and described, for various modifications within the scope of the claims may occur to persons skilled in the art.

It is claimed and desired to secure by Letters Patent:—

1. In combination with a water cooled internal combustion engine having a radiator, a carbureter, intake and exhaust manifolds, and means for securing said manifolds to the engine, of a fuel economizer comprising a vapor collector associated with the radiator filling orifice, a vapor heater mounted upon the exhaust manifold and held in place by the manifold securing means, a vapor injector between the carburetor and the intake manifold, and connections between said collector, said heater and said injector.

2. In combination with a water cooled internal combustion engine having a radiator, a heated manifold, and fastening means for the manifold, of a fuel economizer comprising a vapor collector detachably associated with the engine radiator, a vapor heater secured to the engine manifold by the said fastening means, and a connection between said collector and said heater.

3. In combination with a water cooled internal combustion engine having a radiator, an exhaust manifold, and means for securing said manifold to the engine, of a fuel economizer comprising a vapor collector detachably associated with the radiator filling orifice, a vapor heater secured to the exhaust manifold with the aid of the same means which unites the manifold with the engine, and a connection between said collector and said heater.

4. In combination with a water cooled internal combustion engine having a carburetor and intake and exhaust manifolds, of a fuel economizer comprising a vapor heater detachably associated with the exhaust manifold, a horizontally disposed injection nozzle located between the carburetor and the intake manifold and consisting of reversely directed frusto-conical walls forming an annular recess freely open toward said carburetor and having top orifices through one of said walls directed into said intake manifold, and a connection between said heater and the lower portion of said nozzle.

5. In combination with a water cooled internal combustion engine having a carburetor and intake and exhaust manifolds, of a fuel economizer comprising a vapor heater associated with the exhaust manifold, a horizontally disposed injection nozzle located between the carburetor and the intake manifold and consisting of means forming an annular recess freely open toward said carburetor and having top orifices directed toward said intake manifold, and a connection between said heater and the bottom of said recess.

6. In combination with a water cooled internal combustion engine having a radiator, a carburetor, intake and exhaust manifolds, and means for securing said manifolds to the engine, a fuel economizer comprising a vapor collector detachably associated with the engine radiator filling orifice, a vapor heater detachably secured to the exhaust manifold with the aid of the same means which unites the manifold with the engine, a vapor injector removably inserted between the carburetor and the intake manifold, and connections between said collector, said heater and said injector.

In testimony whereof, the signature of the inventor is affixed hereto.

R. N. MURAKAMI.